United States Patent
Marin et al.

(10) Patent No.: US 6,282,901 B1
(45) Date of Patent: Sep. 4, 2001

(54) INTEGRATED AIR SEPARATION PROCESS

(75) Inventors: Ovidiu Marin, Lisle; Olivier Charon, Chicago, both of IL (US); Bao Ha, San Ramon, CA (US)

(73) Assignee: L'Air Liquide, Societe Anonyme pour l'Etude et l'Exploitation des Procedes Georges Claude, Paris (FR)

( * ) Notice: Subject to any disclaimer, the term of this patent is extended or adjusted under 35 U.S.C. 154(b) by 0 days.

(21) Appl. No.: 09/619,348

(22) Filed: Jul. 19, 2000

(51) Int. Cl.[7] .................................................. F01K 25/06
(52) U.S. Cl. ............................... 60/649; 60/651; 60/671
(58) Field of Search .............................. 60/649, 651, 671, 60/648

(56) References Cited

U.S. PATENT DOCUMENTS

| | | | |
|---|---|---|---|
| 3,731,495 | 5/1973 | Coveney | 62/39 |
| 4,116,005 | * 9/1978 | Willyoung | 60/655 |
| 4,566,278 | * 1/1986 | Force | 60/655 X |
| 4,977,745 | * 12/1990 | Heichberger | 60/648 X |
| 5,076,837 | 12/1991 | Rathbone et al. | 75/433 |
| 5,133,190 | 7/1992 | Abdelmalek | 60/648 |
| 5,146,755 | 9/1992 | Abdelmalek | 60/655 |
| 5,233,837 | * 8/1993 | Callahan | 60/648 X |
| 5,321,946 | * 6/1994 | Abdelmalek | 60/648 |
| 5,388,395 | 2/1995 | Scharpf et al. | 60/39.02 |
| 5,403,569 | 4/1995 | Abdelmalek | 423/242.7 |
| 5,937,652 | 8/1999 | Abdelmalek | 60/648 |
| 6,025,403 | 2/2000 | Marler et al. | 518/703 |
| 6,047,547 | 4/2000 | Heaf | 60/618 |
| 6,122,932 | 9/2000 | Guillard | 62/643 |

FOREIGN PATENT DOCUMENTS 1455960   11/1976   (GB) .

OTHER PUBLICATIONS

Mathieu et al. "Sensitivity Analysis of the Matiant Cycle" ECOS'98, Nancy, France, vol. 11, pp. 775–758; 1998.

* cited by examiner

*Primary Examiner*—Hoang Nguyen
(74) *Attorney, Agent, or Firm*—Kurt D. Van Tassel; Deborah G. VandenHoff; Van Tassel & Associates (57) ABSTRACT

An integrated air separation process produces an $O_2$-enriched gas stream and an $N_2$-enriched gas stream in an air separation unit. The $N_2$-enriched gas stream is heated in a first heat exchanger associated with a first boiler and then power is generated from the heated gas stream. The $O_2$-enriched gas stream is introduced with fuel to a combustor associated with the first boiler, producing flue gas. At least a portion of the flue gas exiting the first boiler is used to generate power. In a preferred embodiment, another portion of the flue gas exiting the first boiler is recycled to the first boiler, as a temperature controlling fluid.

31 Claims, 4 Drawing Sheets

INTEGRATED AIR SEPARATION PROCESS

FIELD OF THE INVENTION

The present invention relates to an integrated air separation process. More specifically, the present invention relates to a process for separating at least oxygen and nitrogen from air and integrating the use of oxygen and nitrogen into a process for efficiently generating steam and electrical power.

BACKGROUND DISCUSSION

Cogeneration involves using a single fuel source to simultaneously produce, in the same facility, thermal energy, usually in the form of steam, and electric energy. Since the Public Utility Regulatory Policy Act of 1978, owners of cogeneration facilities have been given a financial incentive to sell excess electrical power to utility companies, while utilities are encouraged to purchase that electrical power. Consequently, there has been a continuing effort to improve the energy efficiency of cogeneration plants, particularly in the United States. Moreover, the rising and volatile costs of natural gas have increased the economic incentive for many cogeneration plants to use other fuel sources, such as coal, for example.

Many cogeneration processes use an integrated, high-efficiency combined cycle to increase efficiency. Typically, a combined cycle is a steam turbine (i.e., Rankine-cycle) thermodynamically coupled with a gas turbine (i.e., Brayton-cycle). Steam and gas turbine combined cycle systems are often used where natural gas is the fuel source because natural gas tends to have a lower concentration of impurities that can cause hot corrosion, fouling and rapid deterioration in the gas turbine parts, particularly gas turbine blade surfaces. Therefore, historically, use of high-efficiency steam/gas combined cycle systems has been discouraged where coal is used as a fuel source due to the various impurities in coal that can cause gas turbine corrosion. Consequently, when using a steam/gas combined cycle in a coal combustion cogeneration process, it is important to limit the gas turbine's exposure to flue gas impurities and temperatures significantly exceeding the maximum admissible value (i.e., in a range of from about 1000° C. to about 1450° C.) for the gas turbine's materials of construction and its other operating conditions. This method will help forestall significant corrosion problems with the gas turbine and, thereby, keep equipment maintenance costs down.

U.S. Pat. No. 4,116,005 by Willyoung proposes using a fluidized combustor bed containing sulfur-sorbing particles that are fluidized by a gas turbine's air exhaust, at about atmospheric pressure, which also provides an $O_2$ source for the coal's combustion. However, Willyoung's proposed system fails to further enhance the inherent efficiency of using a steam/gas combined cycle in a cogeneration process. Also, Willyoung's modification of the combustion chamber with a fluidized bed requires significant expense and upkeep for limiting gas turbine corrosion.

Another factor challenging many coal fired cogeneration processes are gaseous emissions into the atmosphere, particularly nitrogen oxides ($NO_x$), such as nitrogen oxide (NO), nitrogen dioxide ($NO_2$) and nitrous oxide ($N_2O$), sulfur oxides ($SO_x$), such as sulfur dioxide ($SO_2$) and sulfur trioxide ($SO_3$), and carbon dioxide ($CO_2$). Some global warming proponents relate excess $N_2O$ and $CO_2$ emissions to climatological change. Also, $NO_x$ emissons, such as NO or $NO_2$, in sufficient concentration, can be toxic to health and the environment. Additionally, $SO_x$ emissions, in sufficient concentration, can contribute to the production of "acid rain," which can have a detrimental effect on various plant and aquatic life. Thus, it is possible that many or all of these gases could become more stringently regulated, at least in certain market-developed countries or regions, such the United States, Canada, Japan and Europe. Consequently, this prospect of increasing regulatory stringency for some or all gaseous emissions that are typically coal combustion byproducts has made coal-fueled cogeneration processes less attractive from an operational cost standpoint.

For instance, various countries, including, among others, France, Germany, the United Kingdom, Australia, the United States, Canada and Japan have elected to adopt the Kyoto Protocol, which ensued from the United Nations Framework Convention on Climate Change, held in December, 1997 at Kyoto, Japan. Under the Kyoto Protocol each participant agreed in principle to "implement and/or further elaborate policies and measures in accordance with its national circumstances" to, among other things, enhance energy efficiency and protect reservoirs of certain atmospheric gases not controlled by the Montreal Protocol (e.g., $CO_2$).

Generally, under the Kyoto Protocol the participating countries agreed to limit emissions of greenhouse gases specified under the Protocol, including $CO_2$, methane ($CH_4$), $N_2O$, hydrofluorocarbons (HFCs), perfluorocarbons (PFCs) and sulfur hexafluoride ($SF_6$), as well as work towards reducing the overall emissions of these gases by at least 5 percent below 1990 levels in the target period of 2008 to 2012. To date, no legislative amendments to the U.S. Clean Air Act Amendments of 1990 (CAAA) have been passed that would require facilities operating in the U.S. to comply with the Kyoto Protocol greenhouse gas emissions target. Nonetheless, the present U.S. administration has made a policy decision to adopt and promote the Kyoto Protocol. Accordingly, companies operating in the U.S. that have significant $CO_2$ emissions have been encouraged to voluntarily work towards the Kyoto Protocol's target level for the greenhouse gases specified. Also, if good progress towards the Protocol's goals is not shown, it is possible that some further amendments to the CAAA could flow from the Kyoto Protocol. CAAA amendments conforming with the Kyoto Protocol could also be motivated if models are developed to more definitively measure and predict the extent of global climate changes based on current and projected gaseous emissions. Thus, limiting the gaseous emissions, particularly from coal-fueled power generation plants, while maintaining an energy efficient power generation process is becoming a more important commercial objective.

For example, U.S. Pat. No. 5,937,652 by Abdelmalek proposes to produce energy more efficiently and reduce $CO_2$ emissions from a combined coal gasification and synthesis gas (i.e., a carbon monoxide (CO) and hydrogen gas ($H_2$) mixture) combustion process. The coal gasification step is conducted under an oxygen ($O_2$) free atmosphere, while using $CO_2$ and steam as oxidants for the coal fuel. The heat from the coal/$CO_2$ gasification reaction is used to produce steam for driving a steam turbine/generator that produces electricity. Also, Abdelmalek separates $CO_2$ from sulfur dioxide ($SO_2$) and other gases discharged from a boiler using a cyclone separator system disclosed in U.S. Pat. Nos. 5,403,569 and 5,321,946.

Abdelmalek indicates that the process has a higher efficiency because the gasification reaction is run without $O_2$, while the separated $CO_2$, which is recycled back to the gasification chamber for reacting with coal, produces a nitrogen ($N_2$) free synthesis gas, namely a CO and $H_2$ mixture. This CO/H$_2$ mixture is then combusted with O$_2$ to generate heat. According to Abdelmalek, the gross heat value of his combined coal gasification, where little to no O$_2$ is present, and synthesis gas combustion process, where CO and H$_2$ are reacted with O$_2$ to produce the principle heat, is 20% greater versus conventional coal combustion processes, where coal is burned using O$_2$ as a principle oxidant. Abdelmalek also contends that his process reduces CO$_2$ emissions by 20%. Moreover, Abdelmalek teaches that the combustion reaction chemistry, particularly where coal is a fuel source (e.g., coal+O$_2$), makes conventional combustion type reactions inherently limited in the extent to which they can be made any more efficient, even in the context of a cogeneration process. Consequently, Abdelmalek fails to disclose how to improve the efficiency of a cogeneration process primarily using direct combustion of a fuel, such as coal, and/or reduce CO$_2$ emissions to the atmosphere, as well as other gaseous emissions, such as nitrous oxide (NO), nitrous oxide (N$_2$O) and nitrogen dioxide (NO$_2$), (collectively called NO$_x$) and/or sulfur dioxide (SO$_2$) and sulfur trioxide (SO$_3$) (collectively called SO$_x$).

Another example of producing CO$_2$ and energy from the same process and fuel source is disclosed in U.S. Pat. No. 6,047,547 by Heaf. Heaf proposes a portable integrated cogeneration system that produces electric power, steam and liquid CO$_2$ and other products necessary for producing and filling bottled or canned beverage products. Specifically, Heaf proposes using a combustion engine generator (CEG) to produce electric power and a combustion powered water boiler to produce steam. A CO$_2$ recovery unit connected with the CEG and water boiler receives exhaust gases from the CEG and water boiler for separating and recovering CO$_2$ from the exhaust gases and a compressor is used to liquify the recovered CO$_2$. Heaf suggests that his cogeneration system can produce large quantities of CO$_2$ from one and preferably both the CEG and the combustion powered water boiler. But, with respect to operating efficiency, Heaf only suggests that his integrated cogeneration system "is efficient and saves costs when incorporated into a beverage production facility." But Heaf fails to quantify the efficiency of his proposed cogeneration process. Moreover, Heaf fails to disclose any means or methods for improving operating efficiency in combustion powered boiler systems used outside the context of a beverage production and bottling facility.

U.S. Pat. No. 5,067,837 by Rathbone et al is directed to an air separation process in combination with a chemical process. A nitrogen stream produced in the air separation unit is pressurized to at least 5 atmospheres and heated via heat exchange with a hot fluid produced in the chemical process. The heated nitrogen is then expanded in an expansion turbine to produce work. The nitrogen exiting the turbine is: (a) used to heat the oxygen or fuel in a heat exchanger; (b) vented to the atmosphere; or (c) used to raise steam in a steam generator. However, Rathbone suggests using O$_2$ in a partial oxidation type reaction where purified natural gas is reacted with O$_2$ to form a synthesis gas with a desired CO content (i.e., a gasification process). Also, Rathbone suggests using N$_2$ heated only with a hot synthesis gas produced from a gasification process, rather than a combustion process that oxidizes the fuel more completely to produce a flue gas primarily comprising CO$_2$ and, where natural gas is the fuel, CO$_2$ and water vapor, among other reaction products. Moreover, Rathbone fails to disclose any means or methods for improving operating efficiency in combustion powered boiler systems used outside the context of a natural gas gasification process.

Typically, the overall energy producing efficiency of most coal-fired cogeneration processes is in a range from about 25% to about 35%. Consequently, there is a need for an integrated cogeneration process for producing electrical power and thermal energy with improved efficiency. Preferably, the total efficiency of an improved cogeneration process would be greater than about 40% and, more preferably, greater than about 50%.

Also, the more energy efficient cogeneration process should have a method for reducing corrosion effects on gas turbines used in steam turbine/gas turbine combined cycle, while being adaptable to incorporating, as desired, a system for reducing and/or eliminating various gaseous emissions, such as CO$_2$, NO$_x$ and/or SO$_x$, to the atmosphere.

SUMMARY OF THE INVENTION

According to the invention, there is provided an integrated air separation process, wherein the process uses at least an air separation unit, a first boiler and a second boiler, comprising the steps of:

(a) introducing air to the air separation unit;

(b) separating the air into at least an O$_2$-enriched gaseous stream and an N$_2$-enriched gaseous stream;

(c) introducing at least a portion of the N$_2$-enriched gaseous stream, having a pressure of at least 3 bars (300 kPa), into at least one heat exchanger associated with the first boiler;

(d) generating power by introducing the N$_2$-enriched gaseous stream exiting the first boiler into a first means for generating power;

(e) directing the N$_2$-enriched gaseous stream exiting the first means for generating power into at least one heat exchanger associated with the second boiler;

(f) introducing water into at least one of the first boiler and the second boiler to generate steam;

(g) introducing at least a portion of the O$_2$-enriched gaseous stream, having a pressure of at least 3 bars (300 kPa), and fuel to a first combustor associated with the first boiler to produce a flue gas;

(h) introducing a temperature controlling fluid into the first boiler to control the combustion temperature at a predetermined temperature less than the combustion temperature of fuel and the O$_2$-enriched gaseous stream alone;

(i) generating power by introducing at least a portion of the flue gas stream exiting the first boiler into a second means for generating power; and (j) directing at least a portion of the flue gas stream from the second means for generating power to the second boiler.

According to the invention, there is also provided an integrated air separation process, wherein the process uses at least an air separation unit and a first boiler, comprising the steps of:

(a) introducing air to the air separation unit;

(b) separating the air into at least an O$_2$-enriched gaseous stream and an N$_2$-enriched gaseous stream;

(c) introducing at least a portion of the N$_2$-enriched gaseous stream, having a pressure of at least 3 bars (300 kPa), into at least one heat exchanger associated with the first boiler;

(d) generating power by introducing the N$_2$-enriched gaseous stream exiting the first boiler into a first means for generating power;

(e) introducing water into the first boiler to generate steam;

(f) introducing at least a portion of the $O_2$-enriched gaseous stream, having a pressure of at least 3 bars (300 kPa), and fuel to a first combustor associated with the first boiler to produce a flue gas;

(g) introducing a temperature controlling fluid into the first boiler to control the combustion temperature at a predetermined temperature less than the combustion temperature of fuel and the $O_2$-enriched gaseous stream alone; and (h) generating power by introducing at least a portion of the primary flue gas stream into a second means for generating power;

so that the total efficiency of the integrated process is in a range of from about 40% to about 60%.

BRIEF DESCRIPTION OF THE DRAWINGS

The integrated nature of the present invention's steps will be better understood by referring to the following detailed description of preferred embodiments and the drawings referenced therein, in which.

DETAILED DESCRIPTION OF PREFERRED EMBODIMENTS

Process Overview

An integrated process for air separation, power generation and steam generation produces an $O_2$-enriched gas stream and a $N_2$-enriched gas stream from an $O_2/N_2$ source separated in an air separation unit ("ASU"). The $N_2$-enriched gas stream is treated to have a pressure of at least 3 bars (300 kPa) at the entrance into the heat exchanger.

By "air separation unit" or "ASU" we mean any gas or liquid separating means and process of using the means for separating two or more gaseous and/or liquid components including, without limitation, a membrane system, cryogenic system, vacuum swing adsorption (VSA) system, pressure swing adsorption (PSA) system, temperature swing adsorption (TSA) system and combinations thereof. The ASU may be on-site or high pressure $O_2$ and/or $N_2$ gas streams may be transported, for example, by pipeline from an ASU at a remote location.

By "$O_2/N_2$ source" we mean any mixture, whether in a gaseous state, liquid state or combination thereof, comprising at least $O_2$ and $N_2$, which may be separated into at least an $O_2$-enriched stream and $N_2$-enriched gas stream.

By "gas", we mean that the stream is primarily gaseous, but may have entrained solid particulates or liquid.

By "enriched", we mean that the major component of the gaseous stream exceeds the average concentration of that same gaseous component in the earth's atmosphere. For example, as used herein, an "$O_2$-enriched gas stream" will have greater than about 21% by volume $O_2$ in the gas stream, a "$N_2$-enriched gas stream" will have greater than about 78% by volume $N_2$ in the gas stream, an "Ar-enriched gas stream" will have greater than about 0.9% by volume argon (Ar) in the gas stream, a "$CO_2$-enriched gas stream" will have greater than about $3\times10^{-2}$% by volume $CO_2$ in the gas stream, a "He-enriched gas stream" will have greater than about $5\times10^{-4}$% by volume helium (He) in the gas stream, a "Kr-enriched gas stream" will have greater than about $1\times10^{-4}$% by volume krypton (Kr) in the gas stream, a "Xe-enriched gas stream" will have greater than about $8\times10^{-6}$% by volume xenon (Xe) in the gas stream and so on. Accordingly, a single gas stream may be "enriched" with one or more gaseous components of interest.

By "high pressure" or "higher pressure" we mean a pressure that is greater than or equal to about 3 bar (300 kPa). When used herein, reference to pressure units will be absolute, unless otherwise stated.

The high pressure $N_2$-enriched gas stream is heated in a heat exchanger associated with a first boiler, preferably a high pressure boiler ("HPB"). Power is generated from the heated, high pressure $N_2$-enriched gas stream, for example, with a gas turbine. Preferably, the $N_2$-enriched gas stream is then fed as a heat source to a heat exchanger associated with a second boiler, preferably a low pressure boiler ("LPB").

Provided there is at least one HPB, it will be understood in the description and drawings that there may be additional HPB's and/or LPB's. More preferably, there is at least one HPB and at least one LPB.

The $O_2$-enriched gas stream from the ASU is introduced with fuel into a combustor in or connected to the HPB and, optionally, into a combustor in or connected to the LPB. As fuel is burned, flue gas is produced. In a preferred embodiment, flue gas exiting the HPB is split into a primary flue gas stream and a secondary flue gas stream. Preferably, the secondary flue gas stream is recirculated to the HPB combustor. The primary flue gas stream is used to generate power and then directed to the LPB.

Steam is produced by introducing water to the LPB, the HPB or both, in series or parallel. The steam can be used as a source of industrial steam, a source of power, or both.

The total efficiency of the integrated process is preferably in a range of from about 40% to about 60%. As used herein, efficiency of the integrated process is calculated as a ratio between the total output power resulting in the integrated process and the theoretical heat input arising from the fuel introduced into the boiler(s).

Figure 1:
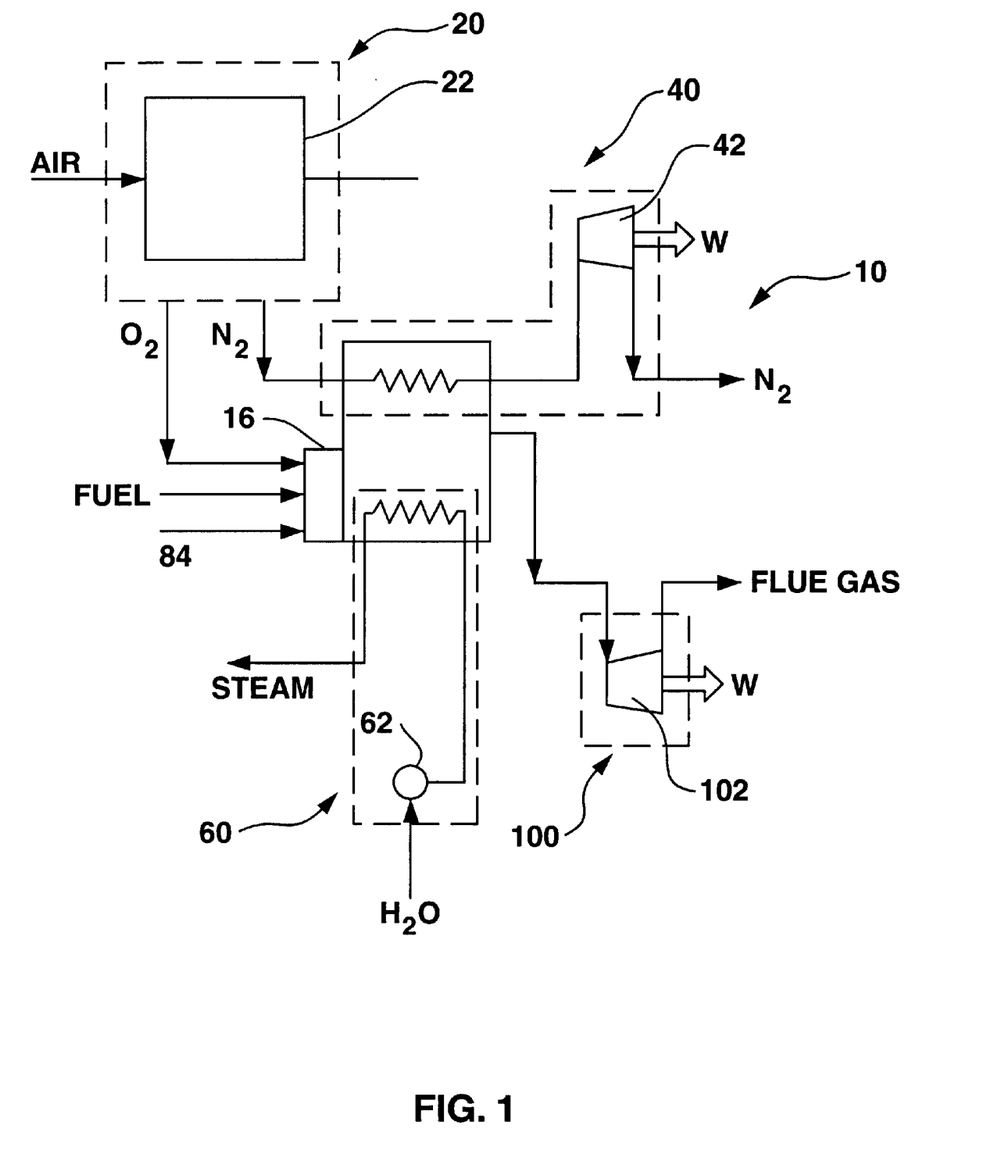
FIG. 1 is a flow diagram of one embodiment of the integrated process illustrating cooperative modules of an air separation process with interdependent power and steam generation processes.
Figure 2:
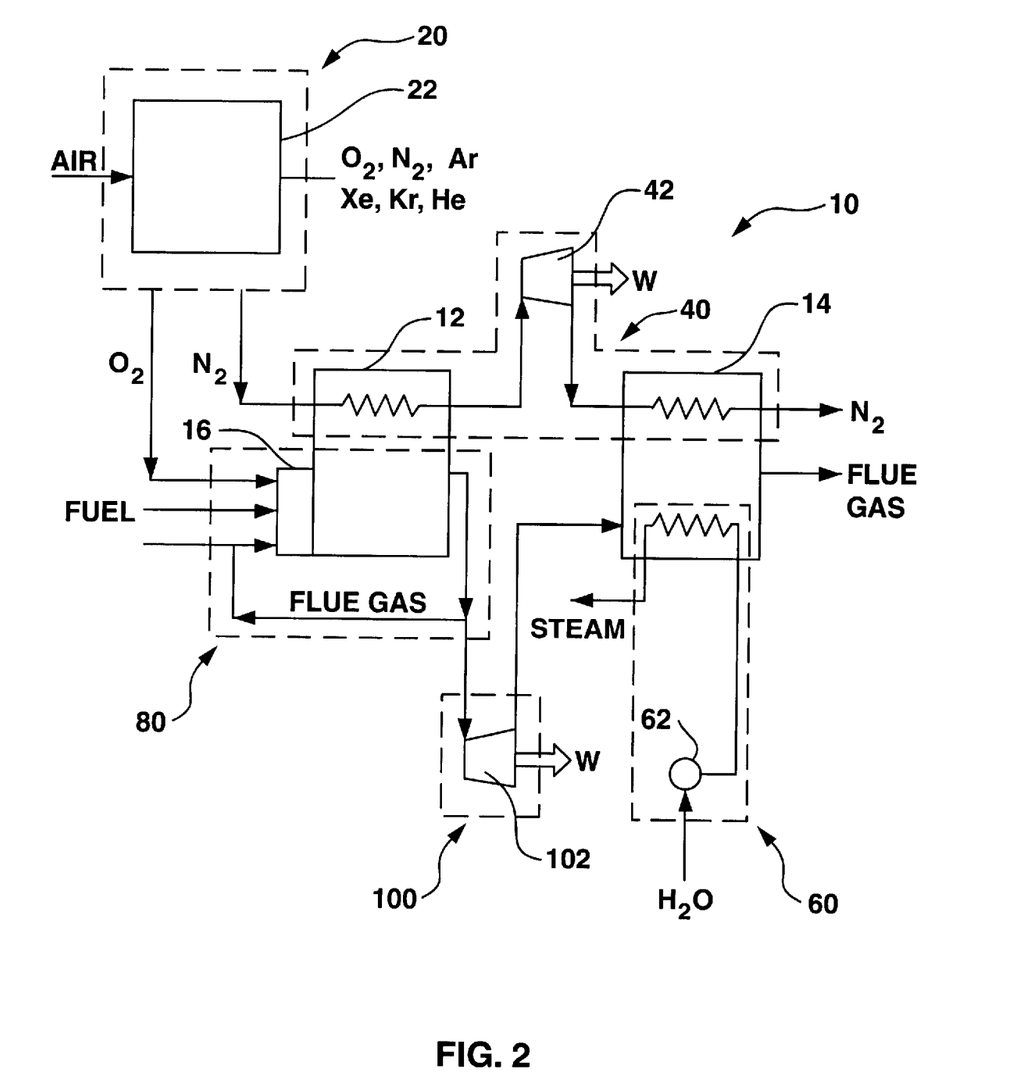
FIG. 2 is a flow diagram of another embodiment of the integrated process illustrating cooperative modules of an air separation process with interdependent power and steam generation processes.
Figure 3:
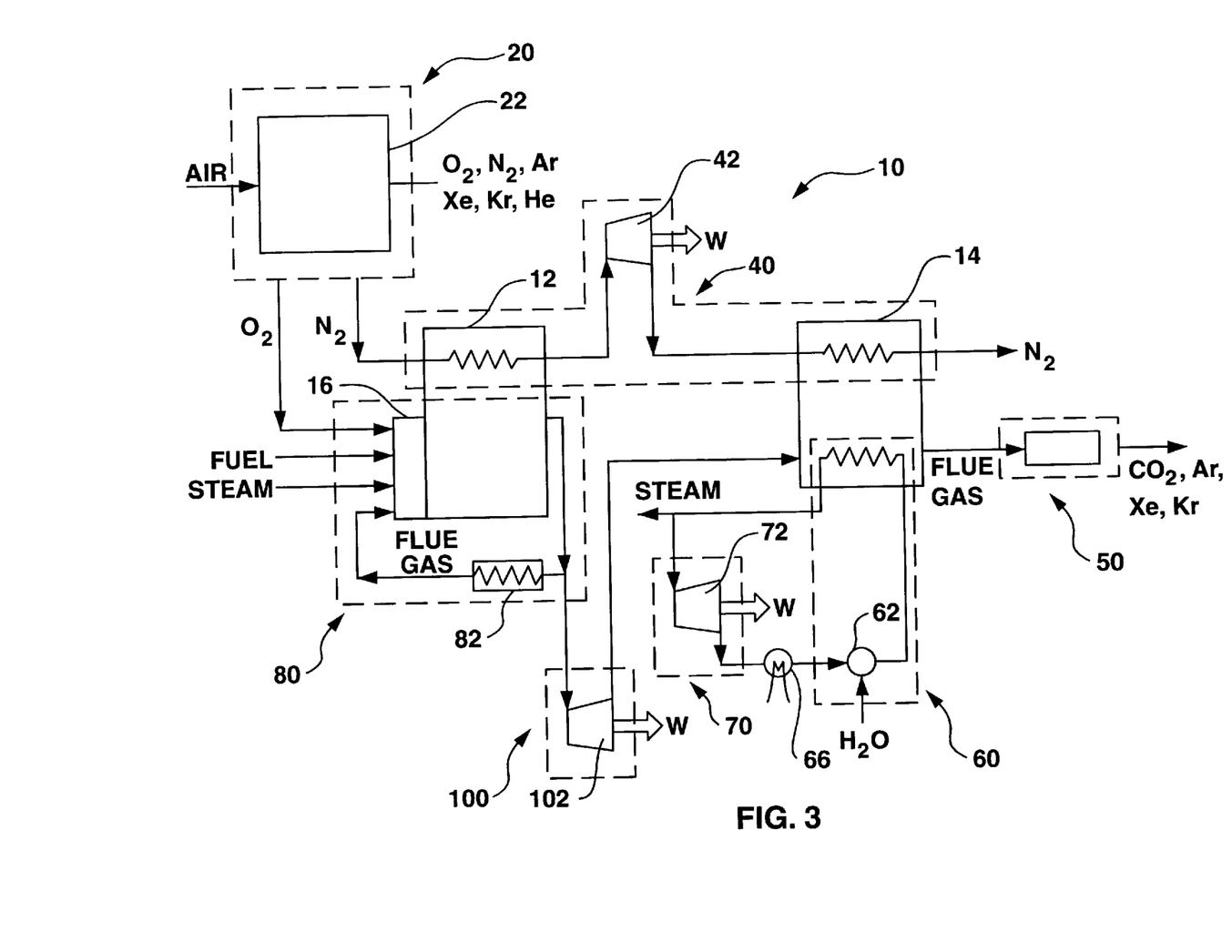
FIG. 3 is a flow diagram of a further embodiment of the integrated process illustrating optional cooperative modules of an air separation process with interdependent power and steam generation processes.

Referring now to FIGS. 1 and 2, an integrated system 10 for air separation, power generation and steam generation of the present invention has an High Pressure $O_2/N_2$ ("$HPO_2N_2$") Generation Module 20, an $N_2$ Power Generation Module 40, a Steam Generation Module 60, and a Flue Gas Driven Power Generation Module 100. A temperature controlling fluid 84 is used to control the combustion temperature at a predetermined temperature less than the combustion temperature of fuel and the $O_2$-enriched gaseous stream alone. In a preferred embodiment, the temperature controlling fluid 84 is flue gas from a Flue Gas Generation/Recirculation Module 80 (FIG. 2). In another embodiment, the temperature controlling fluid 84 is steam or a combination of steam and flue gas (as shown in FIG. 3). Each of these modules perform a task to support the cooperative function of the integrated process, which integrates an air separation process with interdependent power and steam generation processes.

The integrated process uses at least an ASU 22, a first HPB 12, and power generation means. In the embodiment shown in FIG. 2, the integrated process also uses a second LPB 14. A first combustor 16 is in or connected to the HPB 12. Optionally, a second combustor (not shown) may be in or connected to with the LPB 14.

High Pressure $O_2/N_2$ Generation Module

The $HPO_2N_2$ Generation Module 20 produces an $O_2$-enriched gas stream and an $N_2$-enriched gas stream from an air input stream separated in the ASU 22. The $O_2$-enriched and $N_2$-enriched gas streams each have a pressure of at least 3 bars (300 kPa).

At least a portion of the high pressure $N_2$-enriched gas stream produced in the $HPO_2N_2$ Generation Module 20 is used as an input for the $N_2$ Power Generation Module 40.

At least a portion of the high pressure $O_2$-enriched gas stream produced in the $HPO_2N_2$ Generation Module 20 is used as an input for the Flue Gas Generation/Recirculation Module 80.

The ASU 22 of the $HPO_2N_2$ Generation Module 20 can be, for example, without limitation, a cryogenic unit, a membrane unit, an adsorption unit or a combination thereof. The ASU 22 may be on-site or high pressure $O_2$ and/or $N_2$ gas streams may be transported, for example, by pipeline from an ASU 22 at a remote location.

When trace impurities in the liquid and/or gaseous feed stream can lead to the combination of a combustible impurity with an oxidant (e.g., acetylene in an $O_2$-enriched gas or liquid) a potential explosion hazard exists. Accordingly, special precautions should be taken to reduce and/or eliminate that explosion hazard as well as any other explosion hazards. Thus, the use of potential ignition sources should be kept to a minimum, particularly in $O_2$-enriched gas compression and in systems for handling $O_2$-enriched gas at elevated pressures. Also, when air is used as the $O_2/N_2$ source, it should be treated prior to introducing it to the ASU 22. The air treatment process can include, without limitation, a filtering step to remove and/or reduce to acceptable limits potential gas stream contaminants (e.g., particulates and hydrocarbons, if any) and a gas compressing step, in accordance with appropriate safety precautions. Also, procedures should be implemented to protect personnel working around any cryogenic process (e.g., exposure to cryogenic burns and asphyxia) and any high temperature and pressure process, as well as to protect the equipment used in and around those processes.

Other products produced from the ASU 22 can include, without limitation, one or more of nitrogen, oxygen, argon, helium, krypton and xenon, independently in liquid or gaseous form.

The high pressure $N_2$-enriched gas stream can be produced in the $HPO_2N_2$ Generation Module 20 in a number of ways. For example, a $N_2$-enriched gas stream produced in the ASU 22 can be compressed in a post-air separation compressor. After the $N_2$-enriched gas stream is compressed to produce a high pressure gas stream with the desired pressure, the high pressure $N_2$-enriched gas stream is introduced into HBP 12. Alternatively, a pressurized $N_2$-enriched substantially liquid stream may be produced using the ASU 22 by pressurizing liquid $N_2$, produced in the ASU 22, with a pumping action, for example. In this alternative case, the pressurized $N_2$-enriched substantially liquid stream is then passed through a heat exchanger that heats and vaporizes the $N_2$-enriched stream while cooling the air stream fed to ASU 22. Accordingly, with this alternative approach, a high pressure $N_2$-enriched gas stream is produced and fed to the HBP 12.

In any case, the integrated process efficiency is increased by using a high pressure $N_2$-enriched gas stream having a pressure of at least 3 bars (300 kPa). Preferably, the pressure of the $N_2$-enriched gas stream is in a range of from about 3 bars (300 kPa) to about 50 bars (5000 kPa). More preferably, the pressure of the $N_2$-enriched gas stream is in a range of from about 10 bars (1000 kPa) to about 40 bars (4000 kPa). Most preferably, the pressure is in a range of from about 12 bars (1200 kPa) to about 30 bars (1800 kPa).

The high pressure $O_2$-enriched gas stream may be produced in the same manner as the high pressure $N_2$-enriched gas stream. Preferably, the pressure of the $O_2$-enriched gas stream is in a range of from about 3 bars (300 kPa) to about 50 bars (5000 kPa). More preferably, the pressure of the $O_2$-enriched gas stream is in a range of from about 10 bars (1000 kPa) to about 40 bars (4000 kPa). Most preferably, the pressure is in a range of from about 12 bars (1200 kPa) to about 30 bars (1800 kPa).

$N_2$ Power Generation Module

The $N_2$-enriched gas stream produced in the $HPO_2N_2$ Generation Module 20 is heated in a heat exchanger associated with the HPB 12. Power is then generated by introducing the heated $N_2$-enriched gas stream from the HPB 12 into a power generation means, which may comprise a gas turbine 42. Because $N_2$ is non-corrosive, corrosion and fouling of the gas turbine is significantly reduced.

In the embodiment shown in FIG. 2, the thermal energy of the $N_2$-enriched gas stream exiting the power generation means is used in a heat exchanger associated with the LPB 14, for example as a heat source for the Steam Generation Module 60. The use of the $N_2$-enriched gas stream for power generation and, optionally, for heat exchange in the LPB 14 are important to achieving the desired overall process efficiency, while significantly reducing gas turbine maintenance costs.

Also, the $N_2$-enriched gas stream exiting the gas turbine 42 in the FIG. 1 embodiment or the LPB 14 in the FIG. 2 embodiment may be used as a product, once it has passed through the $N_2$ Power Generation Module 40. Depending on the requirements of the product, the $N_2$-enriched gas stream may be treated to remove any impurities. Alternatively or additionally, the $N_2$-enriched gas stream may be treated to produce a compressed gaseous product or a liquid $N_2$ product. Moreover, optionally, a portion of the $N_2$-enriched gas stream or liquid $N_2$ can be treated and recycled back to the HPB 12 as a high pressure gas input to its heat exchanger.

Steam Generation Module

Steam is generated in the Steam Generation Module 60 by heating water in a heat exchanger, in the HPB 12 and/or the LPB 14.

The Steam Generation Module 60 is illustrated in FIG. 1 as utilizing thermal energy from the HPB 12. In another embodiment, illustrated in FIG. 2, the Steam Generation Module 60 uses thermal energy from the LPB 14. In still another embodiment (not shown in FIG. 1 or FIG. 2), the Steam Generation Module 60 uses thermal energy from both the HPB 12 and the LPB 14, in series or in parallel. For example, in a series embodiment, water is introduced to the LPB 14 where steam is produced and this steam from the LPB 14 is subsequently directed to the HPB 12 where it is superheated. A parallel embodiment can be used where two different grades of steam are desired. In a parallel embodiment, low pressure steam is produced in the LPB 14 and high pressure steam is produced in the HPB 12. By "low pressure" steam, we mean steam having a pressure in a range of from about 10 bars (1000 kPa) to about 100 bars (10,000 kPa). By "high pressure" steam, we mean steam having a pressure in a range of from about 150 bars (15,000 kPa) to about 250 bars (25,000 kPa).

The steam produced in the Steam Generation Module 60 may be used as industrial steam in other areas of the plant. For example, it may be desirable to inject steam, as a temperature controlling fluid, into the HPB 12 to control the temperature in the HPB 12 at a predetermined temperature less than the combustion temperature of the fuel and $O_2$-enriched gaseous stream alone.

In one embodiment, the integrated system 10 used to perform the integrated process also includes a Steam Driven Power Generation Module 70 (FIG. 3) linked with the Steam Generation Module 60, using thermal energy from the HPB 12 and/or LPB 14. In this embodiment, electric power is generated by introducing all or part of the steam produced in Steam Generation Module 60 to a power generation means, which may comprise a steam turbine 72. Steam exiting the steam turbine 72 is then condensed in a condenser 66 and recirculated to the LPB 14, using pump 62, with or without additional water. In this embodiment, it is possible to produce both electricity and industrial steam for use in other areas of the plant. It is also possible that, as plant requirements change, the steam may be used as a source for more industrial steam for a period of time and/or more electricity for a period of time. It can be seen that the integrated process of the present invention is versatile.

Flue Gas Generation/Recirculation Module

At least a portion of the high pressure $O_2$-enriched gas stream produced in the $HPO_2N_2$ Generation Module 20 is introduced with fuel to the combustor 16 of the HPB 12. As the fuel burns, flue gas is produced. An advantage of using an $O_2$-enriched gas stream as an oxidant for fuel combustion is that combustion is more complete. A further advantage of an $O_2$-enriched feed is that $NO_x$ production is reduced because the primary source of nitrogen for producing $NO_x$ has been substantially reduced with the ASU 22.

In a preferred embodiment, the flue gas stream exiting the HPB 12 is split into a primary flue gas stream and a secondary flue gas stream.

Preferably, the secondary flue gas stream is the input for the Flue Gas Generation/Recirculation Module 80. The secondary flue gas stream is recirculated to the HPB 12, either into combustor 16 or directly into the HPB 12, as a temperature controlling fluid. The recirculated flue gas acts as a diluent, so that the combustion temperature with the $O_2$-enriched gas stream is reduced. The recirculated flue gas stream is used to control the temperature in the combustor 16 and/or the HPB 12 to a temperature less than the combustion temperature of fuel and the $O_2$-enriched gaseous stream alone. This temperature is a function, for example, without limitation, of the HPB 12 materials of construction and the concentration of $N_2$ present in the HPB 12 combustor 16. Specifically, keeping the flue gas stream's temperature from exceeding its maximum admissible value to the gas turbine 42, which can vary based on various operating conditions, will help improve the integrated process efficiency, while reducing gas turbine corrosion and related maintenance costs. Alternatively, as mentioned above, steam may be used as the temperature controlling fluid. In a further alternative, both steam and recirculated flue gas are used as the temperature controlling fluid.

In one embodiment, of the Fuel Gas Generation/ Recirculation Module 80, illustrated in FIG. 3, the secondary flue gas stream passes through a heat exchanger 82 to cool the gas stream prior to introducing it to the HPB 12 combustor 16. In addition to the process efficiency advantages, a cooler secondary flue gas stream reduces deterioration of fans (not shown) used to transport the secondary flue gas stream to the HPB 12 combustor 16.

Because the secondary flue gas stream input into the Flue Gas Generation/Recirculation Module 80 is split from the flue gas stream exiting the HPB 12 prior to the power generation means of the Flue Gas Driven Power Generation Module 100, it is recirculated with substantially no pressure drop. Preferably, the secondary flue gas stream is not subjected to additional compression prior to being recirculated. In this way, the integrated process operates with higher efficiency because no power is consumed with additional flue gas compression.

Preferably, the secondary flue gas stream to the primary flue gas stream ratio is in a range of from about 1:4 to about 19:1. More preferably, the secondary flue gas stream to the primary flue gas stream ratio is in a range of from about 1:2 to about 9:1. Most preferably, the secondary flue gas stream to the primary flue gas stream ratio is in a range of from about 3:2 to about 17:3.

In the integrated process of the present invention, it is possible to change the secondary flue gas stream to primary flue gas stream ratio depending on plant requirements.

Flue Gas Driven Power Generation Module

At least a portion of the flue gas stream exiting the HPB 12 is the input for the Flue Gas Driven Power Generation Module 100. Power is generated by introducing the primary flue gas stream from the HPB 12 into a power generation means, which may comprise a gas turbine 102. In the FIG. 2 embodiment, the primary flue gas stream exiting the power generation means is subsequently fed to the LPB 14 for producing steam in the Steam Generation Module 60.

The primary flue gas stream may be filtered before being directed to the power generation means of the Flue Gas Driven Power Generation Module 100. For example, it may be particularly advantageous to filter the primary flue gas stream when the fuel used in the combustor 16 of the HPB 12 is coal. Other fuels that would preferably be filtered, as appropriate, would include, without limitation, petroleum coke, bitumen, fuel oil, waste fuel oil, each aforementioned fuel in combination with natural gas or a combination thereof. However, when the fuel is solely natural gas, filtration will not likely be required.

Filtration may be conducted in a manner known to those skilled in the art including, for example, without limitation, candle filters, cyclones and combinations thereof.

Accordingly, it should be understood how each of the $HPO_2N_2$ Generation, $N_2$ Power Generation, Steam Generation, and Flue Gas Driven Power Generation Modules and, in a preferred embodiment, the Flue Gas Generation/Recirculation Module perform to support the cooperative function of the integrated process, which integrates an air separation process with interdependent power generation and steam generation processes. Also, it should be understood that, preferably, the integrated process includes a Flue Gas Treatment Module, which would further enhance the integrated process performance, while also reducing $CO_2$, $NO_x$ and/or $SO_x$ emissions, among others.

Flue Gas Treatment Module

In the embodiment illustrated in FIG. 3, the flue gas exiting the LPB 14 is used to produce a $CO_2$-enriched stream in a Flue Gas Treatment Module 50. It will be understood that the flue gas exiting the HPB 12 in the FIG. 1 embodiment could also be directed to a Flue Gas Treatment Module. The composition of flue gas depends on the type of fuel, the composition and concentration of the oxidant and the C:H ratio of the fuel. A non-limiting example of a common flue gas composition is:

30 to 100 mol. % $CO_2$
0 to 70 mol. % $H_2O$

Trace amounts of $NO_x$, $SO_x$ and ash

In the Flue Gas Treatment Module 50, flue gas is treated to remove or convert $NO_x$ and $SO_x$ produced in the combustors of the HPB 12 and/or the LPB 14. $NO_x$ and $SO_x$ can be removed or converted by techniques known to those skilled in the art, including for example, without limitation, scrubbers, catalytic devices and combinations thereof.

Ash and other particulate matter can be removed by techniques known to those skilled in the art, including for example, without limitation, scrubbers, impingement separators, cyclone separators, centrifugal separators, filters, cyclones and combinations thereof.

Water may be removed from the flue gas by techniques known to those skilled in the art, including for example, without limitation, condensers, separators and combinations thereof. In an embodiment of the integrated process of the present invention, the water recovered from the flue gas may be reused as a water source for or to supplement the water input in the Steam Generation Module 60.

In another embodiment, the $CO_2$-enriched stream may be liquified in the Flue Gas Treatment Module 50 to produce a liquid $CO_2$ product. The $CO_2$-enriched stream may be liquified by compression and cooling. Advantageously, rare gases, such as Ar, Xe, and Kr, may also be separated from the flue gas in the Flue Gas Treatment Module 50. Rare gases can be separated using, for example, without limitation, a distillation column (not shown) or controlled freezing zone process. Other means will be apparent to those skilled in the art of separating rare gases.

Examples of Operation

Figure 4:
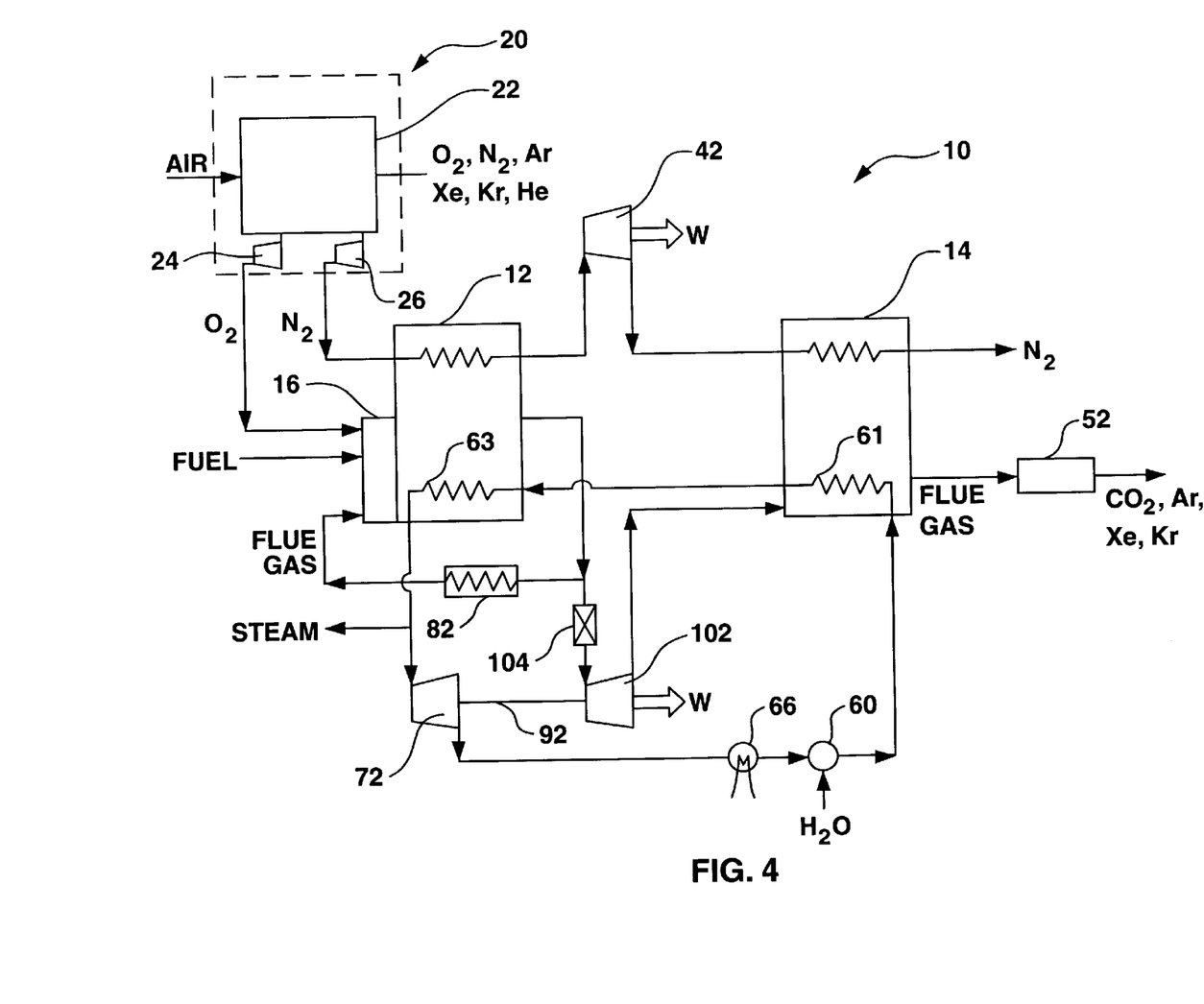
FIG. 4 is a flow diagram of a preferred embodiment of the integrated air separation process.

One preferred embodiment of the invention's operation will be explained referring to FIG. 4.

Air is introduced to the ASU 22 and separated into the desired products including, without limitation, one or more of oxygen, nitrogen, argon, helium, krypton and xenon, independently in liquid or gaseous form. The production of each of these components can be varied, in order to meet customer demands. The $O_2$-enriched gas stream and the $N_2$-enriched gas stream used in the integrated process 10 can be produced from the gaseous or liquid products, in a manner discussed above. Depending on the type of ASU used, each of the $O_2$-enriched and $N_2$-enriched gas streams may require further compression in the $HPO_2N_2$ Generation Module 20 to raise the pressure to at least about 3 bars (300 kPa), for example using compressors 24, 26, respectively.

The $O_2$-enriched gas stream is fed with fuel to the combustor 16 of the HPB 12, and optionally, with additional fuel to a combustor (not shown) associated with the LPB 14.

Examples of suitable boilers for the HPB 12 and the LPB 14 are pulverized solid fuel boilers, pulverized liquid fuel boilers, fluidized bed boilers, natural gas-fired boilers, fire tube boilers, firebox boilers, and water tube boilers.

Preferably, the HPB 12 operates at a pressure in a range of from about 3 bars (300 kPa) to about 50 bars (5000 kPa). More preferably, the HPB 12 operates at a pressure in a range of from about 10 bars (1000 kPa) to about 40 bars (4000 kPa). Most preferably, the HPB 12 operates at a pressure in a range of from about 12 bars (1200 kPa) to about 30 bars (1800 kPa).

Preferably, the LPB 14 operates at a pressure in a range of from about 1 bar (100 kPa) to about 5 bars (500 kPa). More preferably, the LPB 14 operates at a pressure in a range of from about 1 bar (100 kPa) to about 3 bars (300 kPa). Most preferably, the LPB 14 operates at a pressure in a range of from about 1 bar (100 kPa) to about 1.5 bars (150 kPa).

Fuel for the HPB 12 and/or the LPB 14 is a gaseous, liquid or solid carbon-containing compound or a combination thereof. Examples of suitable fuels are natural gas, coal, coal slurries, petroleum coke, bitumen, fuel oil and waste fuel oil, and combinations thereof.

The $N_2$-enriched gas stream exiting the $HPO_2N_2$ Generation Module 20 is introduced to heat exchanger 44 in the HPB 12 and heat exchanger 46 in the LPB 14. The HPB inlet temperature is dependent on the ASU 22 and any subsequent treatment in the $HPO_2N_2$ Generation Module 20, but typically is in a range of from about 30° C. to about 500° C. Preferably, on exiting the HPB, the $N_2$-enriched gas stream is at a temperature in a range of from about 800° C. to about 1500° C.

The $N_2$-enriched gas stream exiting the HPB 12 is subsequently introduced to a gas turbine 42 that can be connected to a power generator (not shown) or a cycle compressor (not shown), such, for example, without limitation, as an ASU compressor, to generate power.

The remaining thermal energy in the $N_2$-enriched gas stream is used in the LPB 14 by directing the output stream of the gas turbine 42 to heat exchanger 46 of the LPB 14.

The thermal energy contributed by the $N_2$-enriched gas stream is used to heat water, which is pumped by pump 62 into heat exchanger 61 in the LPB 14. Steam is directed from the LPB 14 to heat exchanger 63 in the HPB 12 to superheat the steam. On exiting the HPB 12, a portion of the steam is used for industrial steam purposes. The remaining steam is introduced to a steam turbine 72 to generate power. As shown in FIG. 4, the steam turbine 72 is preferably disposed on the same drive shaft 92 as gas turbine 102 used for connection to a power generator (not shown) or a cycle compressor (not shown) cooperatively shared between the Steam Driven Power Generation Module 70 (FIG. 3) and the Flue Gas Driven Power Generation Module 100 (FIGS. 1, 2). In practice, the steam turbine 72 and the gas turbine 102 can be connected to independent power generators or cycle compressors to generate power.

Steam exiting the steam turbine 72 is passed through a condenser 66, where the saturated steam is condensed. Water is pumped by pump 62, with or without additional water, to the LPB 14.

Flue gas produced by combustion of fuel is at a temperature, for example, in a range of from about 1025° C. to about 1450° C. It will be understood that temperature limits are, at least in part, a function of the materials of construction. The flue gas is separated into a primary flue gas stream and a secondary flue gas stream. The secondary flue gas stream is cooled in heat exchanger 82 and recirculated to the combustor 16 of the HPB 12 while the primary flue gas stream is preferably filtered in filter 104 to remove particulates, especially when a solid or liquid fuel is used as fuel. The primary flue gas stream is passed through the gas turbine 102 that is connected to a power generator (not shown) or cycle compressor (not shown) to generate power. The temperature of the flue gas exiting the gas turbine 102, for example, is in a range of from about 300° C. to about 800° C., preferably from about 400° C. to about 700° C. As such, there is still some thermal energy available and the primary flue gas stream is then introduced to the LPB 14, with or without additional fuel and oxygen. The temperature of the discharge stream exiting the LPB 14 is preferably in a range of from about 100° C. to about 300° C., more preferably from about 130° C. to about 250° C., and most preferably from about 150° C. to about 200° C.

The flue gas exiting the LPB 14 is preferably treated in a by-product removal system 52 to selectively remove any particulate matter, water, $SO_x$, and/or $NO_x$ that are mixed with the $CO_2$ and which may have been produced in fuel combustion.

The result of the flue gas treatment is a $CO_2$-enriched product that can be used in numerous applications, including, for example, without limitation, water treatment, beverages, and chemical industry.

Preferred processes for practicing the invention have been described. It will be understood that the foregoing is illustrative only and that other embodiments of the integrated process can be employed without departing from the true scope of the invention defined in the following claims.

What is claimed is:

1. An integrated air separation process, wherein the process uses at least an air separation unit, a first boiler and a second boiler, comprising the steps of:
   (a) introducing air to the air separation unit;
   (b) separating the air into at least an $O_2$-enriched gaseous stream and an $N_2$-enriched gaseous stream;
   (c) introducing at least a portion of the $N_2$-enriched gaseous stream, having a pressure of at least 3 bars (300 kPa), into at least one heat exchanger associated with the first boiler;
   (d) generating power by introducing the $N_2$-enriched gaseous stream exiting the first boiler into a first means for generating power;
   (e) directing the $N_2$-enriched gaseous stream exiting the first means for generating power into at least one heat exchanger associated with the second boiler;
   (f) introducing water into at least one of the first boiler and the second boiler to generate steam;
   (g) introducing at least a portion of the $O_2$-enriched gaseous stream, having a pressure of at least 3 bars (300 kPa), and fuel to a first combustor associated with the first boiler to produce a flue gas;
   (h) introducing a temperature controlling fluid into the first boiler to control the combustion temperature at a predetermined temperature less than the combustion temperature of fuel and the $O_2$-enriched gaseous stream alone;
   (i) generating power by introducing at least a portion of the flue gas stream exiting the first boiler into a second means for generating power; and
   (j) directing at least a portion of the flue gas stream from the second means for generating power to the second boiler.

2. The process of claim 1 wherein the temperature controlling fluid is a secondary flue gas stream separated from the flue gas stream exiting the first boiler.

3. The process of claim 2 wherein the secondary flue gas stream is recycled without significant additional compression to the first combustor.

4. The process of claim 2 wherein the secondary flue gas stream is recycled to the first combustor with substantially no pressure drop.

5. The process of claim 2 wherein the secondary flue gas stream to the power generating flue gas stream ratio is in a range of from about 1:4 to about 19:1.

6. The process of claim 2 wherein the secondary flue gas stream to the power generating flue gas stream ratio is in a range of from about 1:2 to about 9:1.

7. The process of claim 1 wherein the temperature controlling fluid is selected from the group consisting of steam and a mixture of steam and flue gas.

8. The process of claim 1, further comprising directing a discharge stream from the second boiler to a separation system for producing a $CO_2$-enriched stream.

9. The process of claim 1 wherein water is introduced to the second boiler to produce steam and at least a portion of the steam is directed to the first boiler.

10. The process of claim 1, further comprising generating power by introducing at least a portion of the steam exiting the at least one of the first boiler and the second boiler into a third means for generating power.

11. The process of claim 1, further comprising introducing fuel and an $O_2$-enriched gaseous stream to a second combustor associated with the second boiler.

12. The process of claim 1 wherein the $N_2$-enriched gaseous stream has a pressure in a range of from about 3 bars (300 kPa) to about 50 bars (5000 kPa).

13. The process of claim 1 wherein the $N_2$-enriched gaseous stream has a pressure in a range of from about 10 bars (1000 kPa) to about 40 bars (4000 kPa).

14. The process of claim 1 wherein the $N_2$-enriched gaseous stream is pressurized by compressing in a compressor prior to being introduced to the at least one heat exchanger of the first boiler.

15. The process of claim 1 wherein the $N_2$-enriched gaseous stream is pressurized in the air separation unit by pumping liquid nitrogen produced in the air separation unit to produce a pressurized $N_2$-enriched substantially liquid stream and heating the pressurized $N_2$-enriched substantially liquid stream in a heat exchanger while cooling compressed air.

16. The process of claim 1 wherein the $O_2$-enriched gaseous stream has a pressure in a range of from about 3 bars (300 kPa) to about 50 bars (5000 kPa).

17. The process of claim 1 wherein the $O_2$-enriched gaseous stream has a pressure in a range of from about 10 bars (1000 kPa) to about 40 bars (4000 kPa).

18. The process of claim 1 wherein the $O_2$-enriched gaseous stream is pressurized by compressing in a compressor prior to being introduced to the first combustor.

19. The process of claim 1 wherein the $O_2$-enriched gaseous stream is pressurized in the air separation unit by pumping liquid oxygen produced in the air separation unit to produce a pressurized $O_2$-enriched substantially liquid stream and heating the pressurized $O_2$-enriched substantially liquid stream in a heat exchanger while cooling compressed air.

20. The process of claim 1 wherein the air separation unit is selected from the group consisting of a cryogenic unit, a membrane unit, an adsorption unit and combinations thereof.

21. The process of claim 19 wherein the air is compressed prior to being introduced to the air separation unit.

22. The process of claim 1 wherein the flue gas stream is filtered prior to being directed to the second means for generating power.

23. The process of claim 8, further comprising the step of liquifying the $CO_2$-enriched stream.

24. The process of claim 8, further comprising the step of separating a rare gas stream before, during or after the step of producing the $CO_2$-enriched stream.

25. The process of claim 24 wherein the rare gas stream is selected from the group consisting of Ar-enriched gas stream, Kr-enriched gas stream, Xe-enriched gas stream and combinations thereof.

26. The process of claim 14 wherein at least a portion of the $N_2$-enriched gaseous stream exiting the heat exchanger associated with the second boiler is recirculated to the compressor producing the compressed $N_2$-enriched gaseous stream.

27. The process of claim 1 wherein the first and second means for generating power comprise at least a gas turbine.

28. The process of claim 10 wherein the third means for generating power comprises at least a steam turbine.

29. The process of claim 1 wherein the total efficiency of the integrated process is in a range of from about 40% to about 60%.

30. The process of claim 1 wherein the fuel is selected from the group consisting of gaseous, liquid and solid carbon-containing compounds, and combinations thereof.

31. An integrated air separation process, wherein the process uses at least an air separation unit and a first boiler, comprising the steps of:

(a) introducing air to the air separation unit;

(b) separating the air into at least an $O_2$-enriched gaseous stream and an $N_2$-enriched gaseous stream;

(c) introducing at least a portion of the $N_2$-enriched gaseous stream, having a pressure of at least 3 bars (300 kPa), into at least one heat exchanger associated with the first boiler;

(d) generating power by introducing the $N_2$-enriched gaseous stream exiting the first boiler into a first means for generating power;

(e) introducing water into the first boiler to generate steam;

(f) introducing at least a portion of the $O_2$-enriched gaseous stream, having a pressure of at least 3 bars (300 kPa), and fuel to a first combustor associated with the first boiler to produce a flue gas;

(g) introducing a temperature controlling fluid into the first boiler to control the combustion temperature at a predetermined temperature less than the combustion temperature of fuel and the $O_2$-enriched gaseous stream alone; and (h) generating power by introducing at least a portion of the flue gas stream exiting the first boiler into a second means for generating power;

so that the total efficiency of the integrated process is in a range of from about 40% to about 60%.

* * * * *